Figure 1:
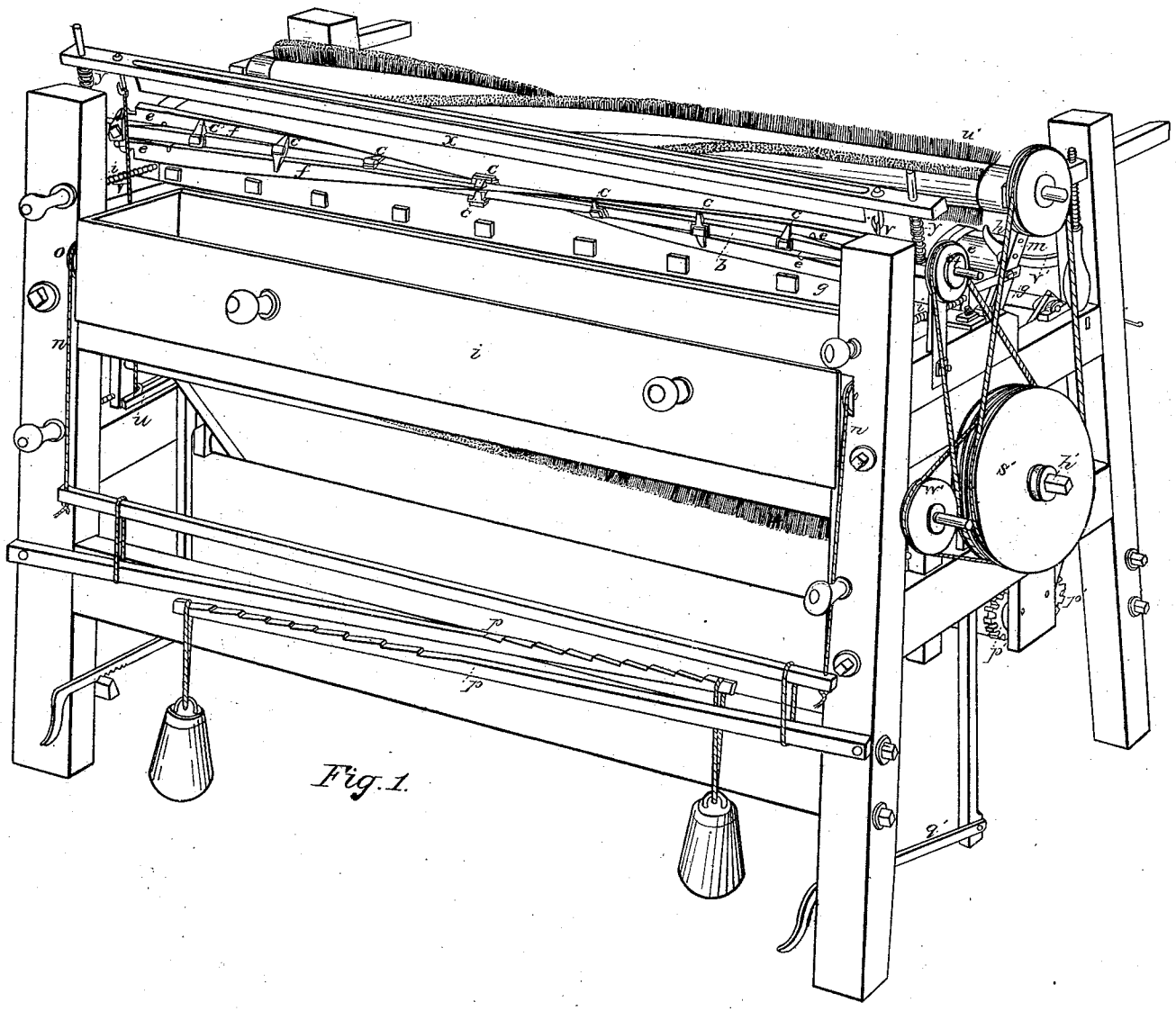

3082X

Sheet 1. - 2 Sheets.

S. Parsons.
Cloth Shearing Mach.

Patented Mar. 2, 1819.

N. PETERS, PHOTO-LITHOGRAPHER, WASHINGTON, D. C.

3082X
Sheet 2. - 2 Sheets.
S. Parsons.
Cloth Shearing Mach.
Patented Mar. 2, 1818.
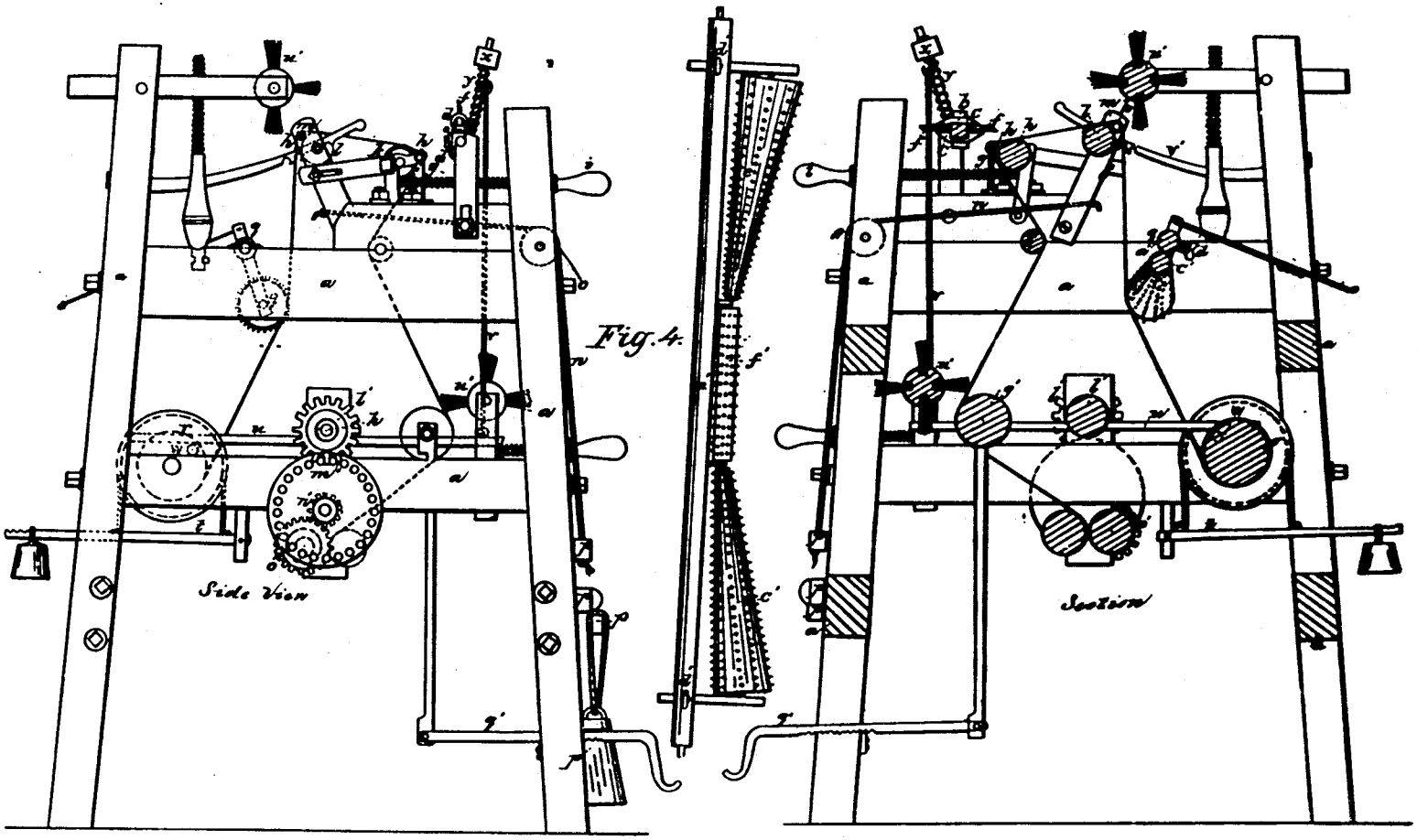
N. PETERS, PHOTO-LITHOGRAPHER, WASHINGTON, D. C.